April 21, 1970 G. E. McTEAGUE 3,507,593

CONTACT NEGATIVE WITH METHOD AND APPARATUS EMPLOYING THE SAME

Filed May 8, 1967 2 Sheets-Sheet 1

GERALD E. McTEAGUE
INVENTOR

BY

BUCKHORN, BLORE, KLARQUIST & SPARKMAN
ATTORNEYS

CONTACT NEGATIVE WITH METHOD AND APPARATUS EMPLOYING THE SAME

Filed May 8, 1967 2 Sheets-Sheet 2

GERALD E. McTEAGUE
INVENTOR

BY
BUCKHORN, BLORE, KLARQUIST & SPARKMAN
ATTORNEYS

United States Patent Office 3,507,593

Patented Apr. 21, 1970

3,507,593

CONTACT NEGATIVE WITH METHOD AND APPARATUS EMPLOYING THE SAME

Gerald E. McTeague, Portland, Oreg., assignor to Tektronix, Inc., Beaverton, Oreg., a corporation of Oregon Filed May 8, 1967, Ser. No. 636,773

Int. Cl. G03b *27/20*

U.S. Cl. 355—87 14 Claims

ABSTRACT OF THE DISCLOSURE

A contact negative comprises a glass plate having a multiplicity of grooves located in the surface thereof adapted for contacting an image-receiving surface, such as a surface covered with photo resist material. The grooved surface of the glass plate is also provided with a metal layer adhered to such grooved surface and configured to provide a pattern for photographic application to the image-receiving surface.

BACKGROUND OF THE INVENTION

In photo resist applications it is usual to employ a flat contact negative, e.g. one formed on a flat plate of glass, for application to an article of manufacture coated with photo resist material. The photo resist material is exposed through the contact negative, after which the photo resist material is developed and the article of manufacture is etched in accordance with the desired pattern. The usually employed gelatin negatives can be used only a few times because of the wear encountered when such negatives contact the photo resist layer. For example, it has been found that the average life of a gelatin negative on a glass plate is between thirty and forty exposures.

An advantageous improvement over the gelatin negative for light and dark patterns wherein shading is not required comprises a refractory metal negative having a metal layer such as one formed of chromium located on a glass plate or the like. This type of negative may contact photo resist layers many times before wearing out. However, even this type of negative is apt to produce errors in photographic duplication processes. It has been found that when extremely fine patterns are to be transferred to a photo resist layer, difficulty is encountered in obtaining exact contact between the metalized negative and an article of manufacture such as another glass plate. Even when a negative and a rigid article of manufacture carrying a photo resist layer are urged together with considerable force, two or three Newton's rings can be observed indicating separation between the two surfaces.

One method for securing adherence between the negative and the article of manufacture is to employ a vacuum frame apparatus which houses both negative and article of manufacture and forces the two together by evacuation of the interior of the frame such that outside air pressure forces the two surfaces into contact. In any case it is nearly impossible to remove all the air from between the two surfaces. At least an annular contact is ordinarily achieved between negative and article, but an air pocket is retained between the central surfaces. This separation, even though slight, nevertheless influences the resolution of fine pattern transfer.

SUMMARY OF THE INVENTION

According to the present invention, a rigid negative is provided with a multiplicity of surface grooves extending thereacross and over which the metal configuration comprising the pattern for transfer is adhered. These grooves are superficial and do not influence the sharpness of the metal pattern nor the images provided. However, the grooves form channels between the negative and the article of manufacture exposed thereby which can be substantially completely evacuated. Therefore, the negative and the article of manufacture can be closely and intimately adhered to provide accurate photographic transfer.

The negative may suitably be placed in a vacuum frame next to the article of manufacture coated with photo resist to be exposed. The vacuum frame is pumped down whereby to force the negative and article closely together while at the same time the grooves are substantially evacuated such that separation is substantially eliminated. The photo resist layer on the article of manufacture is then exposed in the usual manner, and the photo resist layer is developed and etched in accordance with the purposes for which the article is intended to be used.

It is accordingly an object of the present invention to provide an improved contact negative adapted for providing substantially flat contact with an article of manufacture to be exposed thereby.

It is another object of the present invention to provide an improved process for transferring a fine resolution photographic image between flat surfaces.

It is a further object of the present invention to provide improved apparatus for the transfer of a negative image to a photo resist layer.

It is a further object of the present invention to provide an improved method of transferring relatively large but finely detailed patterns to an article of manufacture.

The subject matter which I regard as my invention is particularly pointed out and distinctly claimed on the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
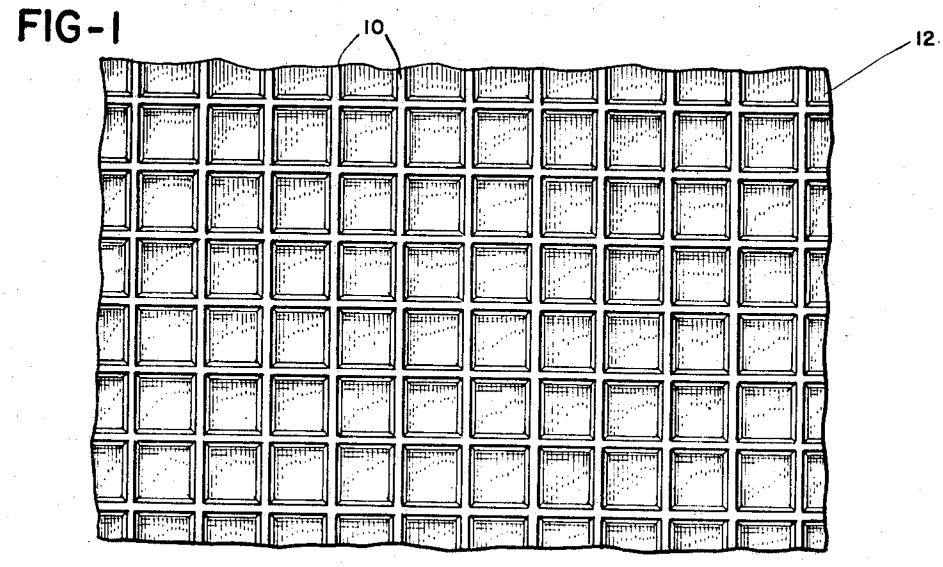
FIG. 1 is a surface view of a portion of a contact negative plate in accordance with the present invention.
Figure 2:
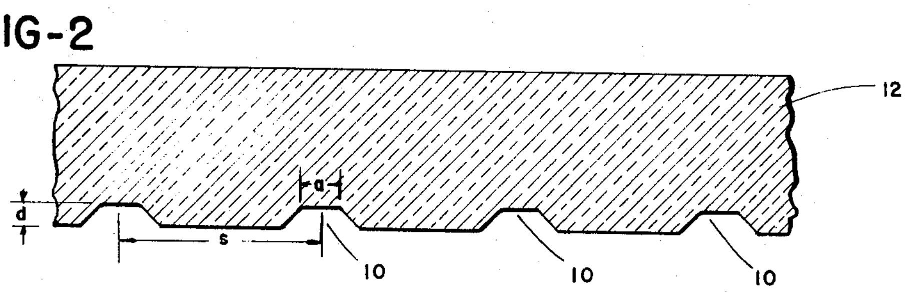
FIG. 2 is a cross-sectional view of the FIG. 1 plate.

FIGS. 1 and 2 illustrate the base plate for a contact negative in accordance with the present invention including a multiplicity of grooves or channels 10 on the flat face of a glass base plate 12 which is to contact an image-receiving surface. These grooves are quite shallow compared with the thickness of the glass base plate, being between 5000 and 12,000 angstroms in depth, with a depth of 7000 to 9000 angstroms being preferred. Shallower grooves do not provide the desired evacuation and separation between negative and image-receiving surface, whereas deeper groove are liable to produce some degree of image degradation in the case of reproduction of a fine pattern. The spacing of the grooves is not as critical. The grooves may, for example, nearly abut one another so that the spacing is comparable to the width of the grooves. On the other hand, the grooves may be rather widely spaced, but it is preferred that at least ten grooves per inch be employed. Also, the width of the grooves is not critical. In one example of a negative base plate constructed in accordance with the present invention, the dimension *a* or root width of the groove was approximately .001 inch, while the groove depth *d* was 7000 angstroms. The spacing *s* between grooves was approximately .01 inch. The grooves were provided in a glass plate 12 having a thickness of 0.25 inch. As illustrated in FIG. 1, a cross-hatched pattern of groove is suitable such that the grooves communicate with each other. However, linear grooves, that is, parallel grooves extending in only one direction, are suitable in the alternative. It is desired in either case that the grooves extend to the edge of the base plate or to the edge of the article of manufacture contacted thereby to provide end communication for evacuation.

Although the base plate may be somewhat flexible, it is preferred that it be rigid. It may be formed, for example, of glass or plastic. In any case, the base plate 12 must be light transmissive, i.e., transparent in order to facilitate the photographic process. The grooves 10 may be formed therein by casting, machining, or by an etching process. In the case of an etching process, a photo resist material is coated upon the surface of the base plate which is to be grooved and this photo resist is exposed to a line pattern, e.g. in the shape of a crossed grid. The photo resist is then developed and the photo resist is removed in the locations where the grooves are desired. An etchant is then applied for producing the grooved topography, after which the remaining photo resist is removed.

Figure 3:
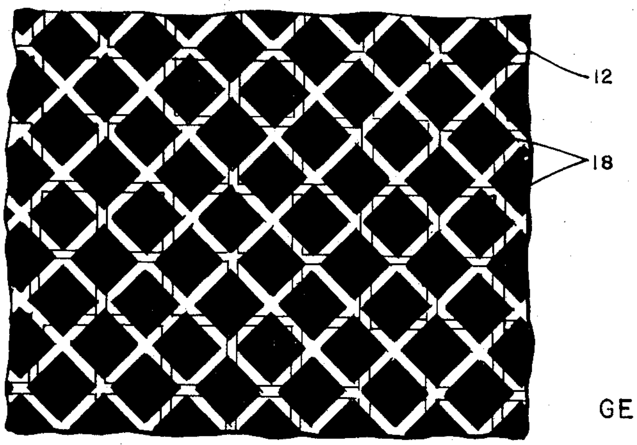
FIG. 3 is a view of a portion of the FIG. 1 plate having a pattern configured in metal adhered thereon.
Figure 4:
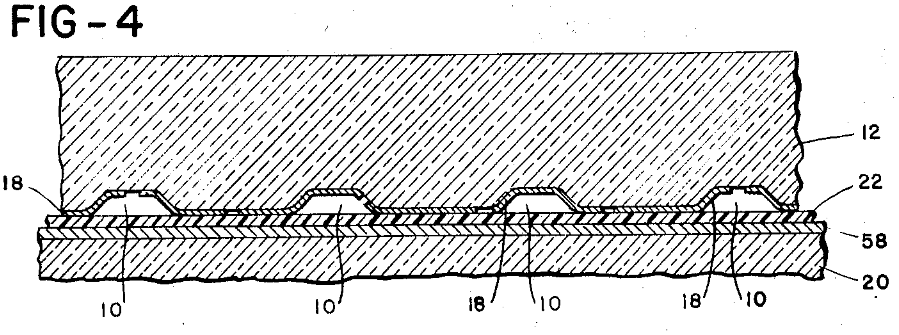
FIG. 4 is a cross-sectional view of the FIG. 3 plate in contact with the photo resist-coated article.

This base plate for a contact negative provided in accordance with the present invention is adapted to receive a configuration or pattern for which duplication is desired. One such pattern is illustrated in FIG. 3 wherein metal squares 18 are disposed in a checkerboard pattern on top of the pre-grooved base plate 12. This configuration or pattern preferably comprises a configuration in a refractory metal, preferably chromium. Chromium has the advantage of being soluble in etchant that would not etch a photo resist layer and the glass base plate. The chromium pattern in the form of squares 18 is suitably formed across the grooved surface of the base plate by means of a photo resist process. In the case of such process, the grooved surface of the base plate is first provided with an overall layer of chromium and covered with the photo resist which is exposed in a desired pattern. Then, the photo resist is developed and portions of the chromium are removed by an appropriate etchant. A cross-section of the contact negative is illustrated in FIG. 4 wherein the chromium pattern at 18 is illustrated as disposed across and into the grooves 10. It is noted that the metal at 18 follows the contour of the grooves so as not to obscure or fill the grooves.

In FIG. 4 the contact negative is illustrated in contact with an image-receiving article 20 having an image-receiving surface here comprising a layer of photo resist at 22 covering a metal layer 58. In the particular example, the image-receiving article comprises the faceplate of a cathode-ray tube upon which it is desired to provide photographically a screen pattern to form a faceplate electrode.

Figure 5:
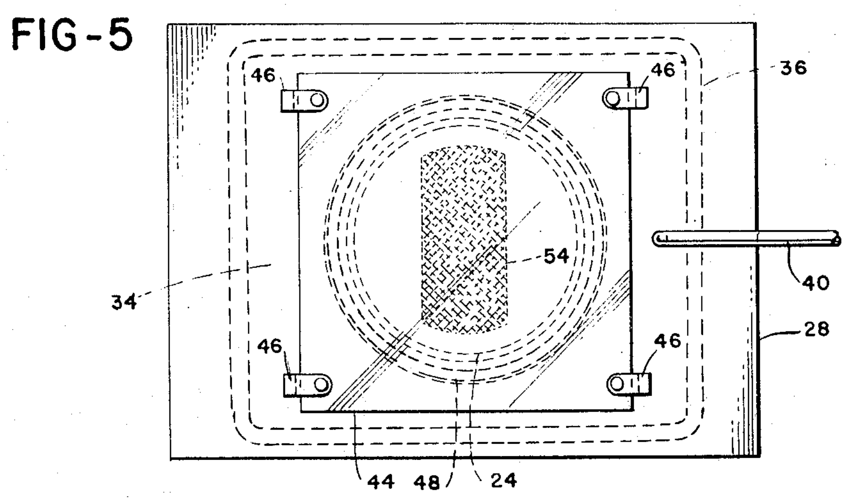
FIG. 5 is a top view of vacuum frame apparatus employed according to the present invention.
Figure 6:
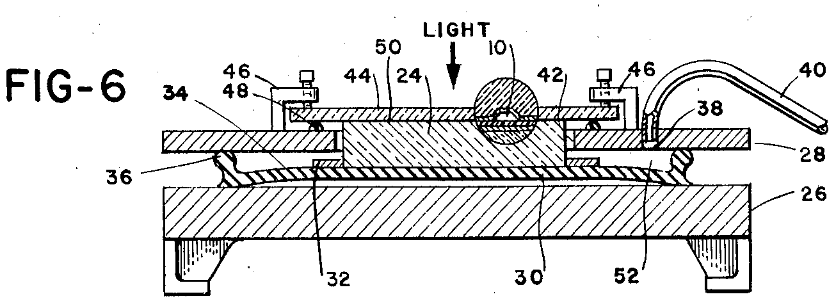
FIG. 6 is a cross-sectional view of the FIG. 5 apparatus.

A process of providing a desired photographic pattern upon an image-receiving article is illustrated in FIGS. 5 and 6. Referring to FIGS. 5 and 6, a cathode-ray tube faceplate blank 24 is placed within a vacuum frame comprising lower frame member 26 and upper frame member 28. The faceplate blank is supported upon a rubber mat 30 within a ring-shaped fixture 32. The rubber mat 30 has a somewhat corrugated or cross-grooved surface 34 and is provided with an upstanding bumper 36 completely around the edge thereof for contacting upper frame member 28 in sealing relation thereto. Upper frame member 28 is provided with an evacuation tube 38 therethrough which communicates to tubing 40 attached to evacuating means comprising a suitable vacuum pump (not shown). The upper frame member 28 is also provided with a central aperture 42 into which a blank 24 is received before the upper frame member 28 is lowered into place onto bumper 36. Clamped upon the top of the upper frame member 28 and across aperture 42 is a contact negative 44 in accordance with the present invention which is clamped to the upper frame 28 by means of edge clamps 46 and sealed thereto with O-ring seal 48. The lower face of negative 44 is grooved, preferably in a cross-hatched pattern as hereinbefore described and provided with a metallized pattern, which it is desired to duplicate upon blank 24. Blank 24 is coated upon the top thereof with a thin layer of metal over which is disposed a layer of photo resist at the interface 50 between blank 24 and contact negative 44.

With the blank 24 located in the vacuum frame as indicated, the region 52 of the housing comprising the vacuum frame and the contact negative is evacuated through tubing 40 whereby rubber mat 30 is raised to the position as shown in the drawing carrying with it blank 24 and pressing the same against contact negative 44. The contact negative and the blank 24 are urged into intimate contact so that a high quality reproduction may be provided on the photo resist or image-receiving surface on blank 24. According to the present invention, this intimate contact is made possible inasmuch as the grooves in the surface of contact negative 44 are evacuated by means of the vacuum frame such that no air pockets are formed between the contact negative 44 and blank 24. The contact is substantially overall and not limited in annular region containing an air pocket therewithin. Therefore, an accurate photographic reproduction is established on the image-receiving surface of contact 24. The linear widths in the metal pattern employed are frequently on the order of .001 inch and therefore comprise an extremely fine pattern for which accurate reproduction is most desirable. The grooves, because of their superficial depth, cause no degradation in the image.

The pattern provided on the contact negative is roughly indicated at 54 in FIG. 5. Light is applied in the direction indicated by the arrow in FIG. 6 so as to expose the blank 24 through contact negative 44 after which the blank 24 is removed from the vacuum frame for development and etching. The contact negative and blank 24 may be easily separated after exposure, due to the presence of the grooves, this comprising an additional advantage of the present invention.

Although the example given above refers to a glass faceplate bearing an image-receiving surface, it is understood that the invention is not limited thereto. For example, the article bearing the image-receiving surface may comprise a semiconductor upon which a circuit is to be formed with the aid of photographic exposure. Alternatively, the image-receiving surface may be in the nature of a photographic duplication.

Although the grooves or channels are illustrated as being provided across the contacting surface of the contact negative, it is understood that the grooves may alternatively be provided across the image-receiving surface, i.e. under a photo resist and metal or other photo-sensitive layer. Alternatively, the grooves may be provided in both surfaces. For example, grooves extending in one direction may be provided on the surface of the contact negative while grooves in the orthogonal direction may be provided across the surface of the image-receiving article.

There will now be discussed specific processes for the formation and utilization of the contact negative provided according to the present invention. It is understood the specific procedures set forth are by way of example and not by way of limitation.

Figure 7:
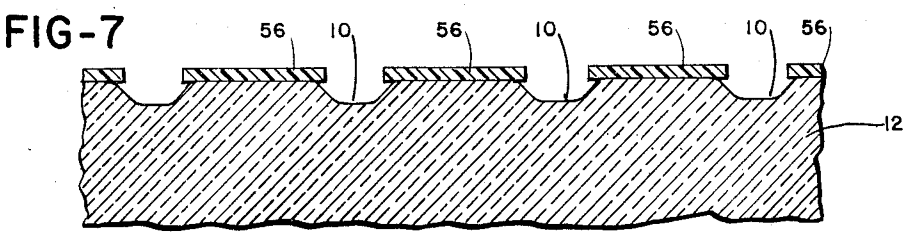
FIG. 7 is a cross-sectional view of a portion of a contact negative plate illustrating a method step in the production of the same.

A 1/4" thick flat glass plate, for forming the base of a contact negative in accordance with the present invention, is first annealed for removing non-uniformities therein. In passing the glass plate through the annealing cycle, including raising the temperature thereof above its annealing temperature, non-uniformities are removed whereby to cause a subsequently applied photo resist to adhere uniformly to the glass plate. After annealing the glass plate is rinsed with acetone and blown dry. The glass plate is then coated with photo resist. In a particular instance, Shipley AZ111 photo resist was employed. The glass plate is then baked at 110° C. for thirty minutes, after which it is exposed with a master negative comprised of a multiplicity of crossed grid lines having the pattern of the grooves which it is desired to provide across the surface of the glass plate. The plate is then immersed in aqueous developer, for example Shipley AZ303 developer was employed. The photo resist is thereby removed from the location of the proposed grooves, leaving squares of photo resist between grooves. The glass plate is then rinsed in water and baked at 110° C. for thirty minutes. The surface of the plate is then etched for four minutes in 1% hydrofluoric acid in aqueous solution. A dam may be employed around the edge of the glass plate so that the etchant does not reach portions of the glass plate other than the desired surface. The appearance of the plate is as illustrated in FIG. 7 wherein the remaining squares of photo resist are indicated at 56. The grooves 10, as indicated, undercut the photo resist layer in a uniform manner partly due to the initial annealing which the glass plate received. The plate is then water rinsed and rinsed with acetone to remove the resist. The plate is then thoroughly cleaned, and in particular it was scrubbed with Bon Ami. The plate was then degreased with isopropyl alcohol. The plate now appears as illustrated in FIGS. 1 and 2.

Next the chromium pattern is formed across the grooved surface of the glass plate. A thin chromium layer is evaporated uniformly over the grooved surface of the glass plate, e.g. approximately 500 angstroms in thickness. The plate is then scrubbed with Bon Ami and degreased with alcohol, after which a thin layer of chromium is again evaporated onto the glass plate. The double evaporation process is employed to remove the likelihood of pinholes in the chromium layer. Conventional metal evaporation equipment may be used to provide the double chromium layer.

The plate is now swabbed with isopropyl alcohol and coated with photo resist. In a particular instance, Shipley AZ111 photo resist was employed. The plate is then baked at 80° C. for thirty minutes and exposed with a master negative of the pattern which is to be applied to the metal layer and to the article of manufacture exposed thereby. The plate is immersed in aqueous developer and then baked at 110° C. for thirty minutes. The plate is then coated with a mixture of equal parts of fine zinc dust, ethylene glycol and glycerine, and immersed in a solution of one part hydrochloric acid and one part ethylene glycol until the chromium is etched in the desired areas. The plate is water rinsed, and rinsed with acetone to remove resist. It may then be cleaned with isopropyl alcohol. The plate at this time appears as illustrated in FIG. 3 wherein the chromium squares 18, for example, are superimposed on the grooved plate, comprising a negative version of the desired pattern.

Now the article of manufacture is prepared to receive this pattern from the negative. In this particular example, the article of manufacture is a faceplate for a cathode-ray tube as illustrated at 20 in FIG. 4 and at 24 in FIGS. 5 and 6. A layer of nickel and then a layer of gold is evaporated on the faceplate to provide the metal layer 58. The faceplate is also coated with photo resist layer indicated at 22 which in this instance comprised kodak thin film resist (K F T R), this being a negative resist. The faceplate is then baked or air dried and placed in a vacuum frame as at 24 in FIG. 6. The faceplate is then exposed through the contact negative as indicated at 44 in FIG. 6 to polymerize the resist in exposed areas, and then the faceplate is removed from the vacuum frame where it is then baked or dried and etched with an appropriate etchant to remove portions of the metal layer 58. It is then rinsed and the resist removed employing a resist stripper. The faceplate is water rinsed and cleaned with detergent to provide a faceplate having a desired screen pattern. The screen pattern on the faceplate will be the reverse of the negative pattern illustrated in FIG. 3. That is, it will comprise interconnected crossed metal conductors having the same configuration as the spaces between squares in the FIG. 3 negative illustrated at 18. Oviously any number of different patterns can be photographically reproduced in foregoing manner.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A plate for use in photographic reproduction for providing an image on an image-receiving surface, such plate being formed of a substantially light-transmissive material and having a substantially flat surface adapted for contact with said image-receiving surface, said surface of said plate being provided with a multiplicity of shallow surface grooves indented into said substantially flat surface for providing air passages during photographic reproduction, and a metal configuration adhered to said grooved surface, the metal configuration being entirely independent of the pattern of the grooves and intersecting various of the grooves covering the root portion of such grooves only in the area of intersection, the metal configuration following the contour of the grooves in the area of intersection so as not to obscure or fill the grooves, said configuration providing a pattern for photographic application to said image-receiving surface.

2. The plate according to claim 1 wherein said metal configuration is a configured layer of chromium adhered to said grooved surface across the grooves thereof.

3. The plate according to claim 1 wherein such plate is formed of glass.

4. The plate according to claim 1 wherein the grooves are shallow as compared to the thickness of said plate, being on the order of less than 12,000 angstroms in depth to prevent image degradation during photographic reproduction.

5. The plate according to claim 1 wherein said grooves are intersecting and wherein at least ones of said grooves extend across the plate between the side edges thereof and to a boundary of an interface as would be provided between the plate and the image-receiving surface to provide common air channels across such interface which communicate to the boundary thereof.

6. Apparatus for providing a precise photographic pattern upon means provided with a substantially planar image-receiving surface, which surface is photosensitive for receiving said pattern, said apparatus comprising:

a light-transmissive substantially planar negative adapted for contact with said image-receiving surface, said negative being provided with a multiplicity of grooves across the surface thereof disposed towards said image-receiving surface, said negative also being provided with a pattern for application to said image-receiving surface, and evacuating means for substantially reducing the pressure within said grooves with said surfaces in contact.

7. The apparatus according to claim 6 wherein said vacuum means comprises a vacuum frame for housing said negative and said means having an image-receiving surface while urging said negative into intimate contact with said image-receiving surface, said vacuum means substantially evacuating said grooves provided on the surface of said negative for enhancing said intimate contact.

8. The apparatus according to claim 6 wherein said image-receiving surface is provided with a layer of photo resist material for contacting the grooved surface of said negative.

9. The apparatus according to claim 6 wherein said negative comprises a glass plate and wherein said pattern comprises a metal configuration adhered to the grooved surface of said plate.

10. The apparatus according to claim 9 wherein said metal configuration is formed of chromium.

11. The method of providing a precise photographic pattern upon means provided with an image-receiving surface comprising:

contacting said image receiving surface with a light-transmissive negative to provide an interface therebetween, said interface being provided with pattern-independent grooves at least ones of which communi-independent grooves at least ones of which communicate from said interface, reducing the pressure within at least ones of said grooves whereby to lessen separation between said negative and said image-receiving surface, and exposing said image-receiving surface by transmitting light through said negative onto said image-receiving surface.

12. The method of providing a precise photographic pattern upon means provided with a substantially planar image-receiving surface comprising:

contacting said image-receiving surface with a substantially planar transparent negative provided with a multiplicity of pattern-independent grooves on the contacting side thereof, reducing the pressure within said grooves to draw said negative and said image-receiving surface into intimate contact, and exposing said image-receiving surface by transmitting light through said negative onto said image-receiving surface.

13. The method for providing precise photographic pattern upon an article of manufacture comprising:

coating a surface of said article of manufacture with a photo resist material, contacting said photo resist material with a substantially planar negative provided with a multiplicity of grooves across the contacting surface thereof, and also being provided with a metal configuration adhered to said grooved surface for contacting said photo-resist material, substantially evacuating said grooves between said negative and said article of manufacture, exposing said photo resist material to said negative, separating said article of manufacture from said negative, and developing said photo resist material on said article of manufacture.

14. The method of providing a precise photographic pattern upon means provided with an image-receiving surface comprising:

contacting said image-receiving surface with a light-transmissive, pattern-carrying negative to provide an interface therebetween, said interface also being provided with pattern-independent grooves at least ones of which communicate from said interface, forcing said negative and said image-receiving surface toward one another and communicating substantially all gases from said interface between said image-receiving surface and said negative through said grooves whereby to lessen separation between said negative and said image-receiving surface, and exposing said image-receiving surface by transmitting light through said negative onto said image-receiving surface.

References Cited

UNITED STATES PATENTS

| | | | |
|---|---|---|---|
| 3,306,176 | 2/1967 | Myers | 355—91 |
| 2,073,313 | 3/1937 | Murray | 95—76 |
| 2,988,979 | 6/1961 | Siegler | 95—76 |
| 3,183,140 | 5/1965 | Gibson | 161—5 |
| 3,230,163 | 1/1966 | Dreyfus | 161—5 |

FOREIGN PATENTS

| | | |
|---|---|---|
| 1,032,845 | 6/1966 | Great Britain. |

NORTON ANSHER, Primary Examiner

R. L. MOSES, Assistant Examiner

U.S. Cl. X.R.

355—91, 94

PO-1050
(5/69)

UNITED STATES PATENT OFFICE
CERTIFICATE OF CORRECTION

Patent No. 3,507,593 Dated April 21, 1970

Inventor(s) GERALD E. McTEAGUE

It is certified that error appears in the above-identified patent and that said Letters Patent are hereby corrected as shown below:

Column 2, line 68, "groove" should be --grooves--.

Column 6, line 3, delete entire line from "is . . ." through ". . . appropriate", and substitute therefor --is developed with a suitable organic developer. The faceplate is then baked or dried and etched with an appropriate-- .

Column 7, line 22, delete entire line "independent grooves at least ones of which communi-"

SIGNED AND
SEALED
SEP 15 1970

(SEAL)
Attest:

Edward M. Fletcher, Jr.
Attesting Officer

WILLIAM E. SCHUYLER, JR.
Commissioner of Patents